United States Patent
Lee et al.

(10) Patent No.: US 9,109,965 B2
(45) Date of Patent: Aug. 18, 2015

(54) TORQUE ANGLE SENSOR

(71) Applicant: LG INNOTEK CO., LTD., Seoul (KR)

(72) Inventors: Chang Hwan Lee, Seoul (KR); Young Wuk Lee, Seoul (KR); Myung Chul Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 64 days.

(21) Appl. No.: 13/894,480

(22) Filed: May 15, 2013

(65) Prior Publication Data

US 2013/0305843 A1 Nov. 21, 2013

(30) Foreign Application Priority Data

May 17, 2012 (KR) .................. 10-2012-0052340
Jun. 5, 2012 (KR) .................. 10-2012-0060437

(51) Int. Cl.
*G01D 18/00* (2006.01)
*G01L 3/10* (2006.01)
*G01B 7/30* (2006.01)

(52) U.S. Cl.
CPC . *G01L 3/104* (2013.01); *G01B 7/30* (2013.01); *G01L 3/10* (2013.01)

(58) Field of Classification Search
CPC ........... B62D 5/00; G01L 5/221; G01L 3/10; G01L 3/101; G01L 5/16; G06F 3/014
USPC ...................... 73/826.325, 862.325, 862.331, 73/862.335; 280/93.5; 324/207.13, 207.25
See application file for complete search history.

(56) References Cited

U.S. PATENT DOCUMENTS

2004/0165307 A1* 8/2004 Gunderson et al. ........ 360/97.02

FOREIGN PATENT DOCUMENTS

| JP | 2004-325317 | A | 11/2004 | |
| JP | 2004325317 | * | 11/2004 | ............. G01B 21/00 |
| JP | 2005-077305 | A | 3/2005 | |
| JP | 2005-93420 | A | 4/2005 | |
| JP | 2007-269281 | A | 10/2007 | |
| JP | 2007269281 | * | 10/2007 | ............... B62D 5/04 |

(Continued)

OTHER PUBLICATIONS

Kaname JP 2007-269281 Chol JP 2012-058249 Takeshi JP 2004-325317 Shinsuke JP 2011-191094.*

(Continued)

*Primary Examiner* — Lisa Caputo
*Assistant Examiner* — Nigel Plumb
(74) *Attorney, Agent, or Firm* — Saliwanchik, Lloyd & Eisenschenk

(57) ABSTRACT

A torque angle sensor according to an exemplary embodiment of the present disclosure includes a torque sensor unit and an angle sensor unit at a housing centrally arranged with a rotation shaft, the torque sensor unit including a stator installed inside the housing, a torque magnet rotatably installed at a center of the stator in conjunction with rotary operation of the rotation shaft, a collector installed at the housing to transmit a magnetic field of the torque magnet, a magnetic device module formed with an individually operating first magnetic device and a second magnetic device in one package to detect the magnetic field transmitted by the collector, and a PCB (Printed Circuit Board) mounted with the magnetic device module, wherein the PCB is arranged to a direction perpendicular to an axial direction of the rotation shaft and installed at a distal end with the magnetic device module.

15 Claims, 3 Drawing Sheets

(56) References Cited

FOREIGN PATENT DOCUMENTS

| JP | 2011-191094 | A | | 9/2011 | |
| JP | 2011-191159 | A | | 9/2011 | |
| JP | 20011191094 | | * | 9/2011 | |
| JP | 2011191094 | | * | 11/2011 | ............... G01L 3/10 |
| JP | 2012-058249 | | * | 3/2012 | ............... G01L 3/10 |
| JP | 2012-58249 | A | | 3/2012 | |
| JP | 2012058249 | | * | 3/2012 | ............... G01L 3/10 |

OTHER PUBLICATIONS

Office Action dated Mar. 18, 2014 in Japanese Application No. 2013-103768.

* cited by examiner

TORQUE ANGLE SENSOR

CROSS-REFERENCE TO RELATED APPLICATIONS

This application claims the benefit under 35 U.S.C. §119 of Korean Application Nos. 10-2012-0052340, filed May 17, 2012, and 10-2012-0060437, filed Jun. 5, 2012, which are hereby incorporated by reference in their entirety.

BACKGROUND OF THE DISCLOSURE

1. Field of the Invention

The teachings in accordance with exemplary and non-limiting embodiments of this disclosure relate generally to a torque sensor mounted on a vehicle to detect a torque change between an input shaft and an output shaft, and to a torque angle sensor configured to measure changes in rotation angle between an input shaft and an output shaft.

2. Discussion of the Related Art

Generally, almost every vehicle employs an electric power-assist steering system. That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is configured such that an Electronic Control Unit (ECU) drives a motor in response to steering conditions and driver manipulation information detected by a speed sensor, a torque sensor and an angle sensor to enhance a steering stability and provide a quick restoring force, whereby a driver can safely steer a vehicle.

The speed sensor is a device detecting a running speed of a running vehicle, the torque sensor is a device outputting an electric signal in proportion to a torque detected by applying a torque to a steering shaft, and the angle sensor is a device outputting an electric signal in proportion to a rotation angle of a steering column.

Meanwhile, the torque sensor is configured in such a manner that at least two magnetic devices are used to measure a torque applied to the steering column, whereby, even if one magnetic device is out of order or develops an erroneous operation, another magnetic device is operated at a normal state. This configuration however suffers from a disadvantage in that the torque sensor becomes voluminous, and each magnetic device must be individually mounted on a printed circuit board.

Meantime, a torque angle sensor is such that a rotor and a stator are provided inside a case, and the torque angle sensor includes a main gear mounted on the rotor and at least two sub-gears meshed with the main gear. A magnet is arranged along a periphery of the rotor in the torque sensor, and a stator having a salient piece corresponding to a polarity of the magnet is arranged on the periphery, whereby a magnetic charge is detected in response to a difference of mutual revolutions between the magnet and the stator to thereby detect a torque of an input shaft and an output shaft, which is then transmitted to the ECU.

In case of the angle sensor, a driver rotates a steering wheel to cause a difference of rotation angles between the steering column and a driving shaft to be generated by rotation of the main gear attached to the steering column in association with the rotation with the steering column, at which time, the magnetic device recognizes a magnetic field of a magnet attached to the sub-gears meshed to the main gear and a rotational direction and transmits a signal thereof to the ECU. Generally, an AMR IC and a Hall IC are widely used for a magnetic device.

Meanwhile, in case of a conventional angle sensor where revolution of a sub-gear for each revolution of a main gear is approximately two revolutions, a maximum error for each rotation of the sub-gear is approximately one degree, and therefore, there is a need of installing at a controller an algorithm capable of reducing an influence by angle non-linearity outputted by the angle sensor, and as a result, there is a need of developing an angle sensor capable of minimizing the error.

BRIEF SUMMARY

The present disclosure is directed to cope with the above-mentioned problems/disadvantages and it is an object of the present disclosure to provide a torque angle sensor including, a torque sensor unit capable of reducing a manufacturing cost through reduced number of parts and being improved in structure for miniaturization, and an angle sensor unit configured to miniaturize a main gear and a sub-gear by reducing the number of teeth of the main gear and the sub-gear, and to miniaturize the product by optimizing an arrangement position of the sub-gears.

It is another object of the present disclosure to provide a torque angle sensor having an angle sensor unit configured to improve output linearity by reducing an error of an angle sensor through optimization of revolution of sub-gears.

Technical problems to be solved by the present disclosure are not restricted to the above-mentioned description, and any other technical problems not mentioned so far will be clearly appreciated from the following description by the skilled in the art.

In a general aspect of the present disclosure, there is provided a torque angle sensor, the torque angle sensor comprising: a housing centrally arranged with a rotation shaft; a torque sensor unit installed inside the housing to detect a torque change between an input shaft and an output shaft; and an angle sensor unit installed inside the housing to detect an angle change between the input shaft and the output shaft, wherein each of the torque sensor unit and the angle sensor unit is installed at a different section of the housing.

Preferably, but not necessarily, the torque sensor unit may include a stator installed inside the housing, a torque magnet rotatably installed at a center of the stator in conjunction with rotary operation of the rotation shaft, a collector installed at the housing to transmit a magnetic field of the torque magnet, a magnetic device module formed with an individually operating first magnetic device and a second magnetic device in one package to detect the magnetic field transmitted by the collector, and a PCB (Printed Circuit Board) mounted with the magnetic device module, wherein the PCB is arranged to a direction perpendicular to an axial direction of the rotation shaft and installed at a distal end with the magnetic device module.

Preferably, but not necessarily, the collector may include an upper collector arranged at an upper surface of the stator, and a bottom collector arranged at a bottom surface of the stator, wherein the upper and bottom collectors are symmetrically provided and are integrally formed near at a center thereof with a first transmission member and a second transmission member.

Preferably, but not necessarily, the first and second transmission members may be integrally formed with the upper and bottom collectors in one body, bent at least twice and surface-contacted to at a distal end thereof to the magnetic device module.

Preferably, but not necessarily, the magnetic device module may be provided in any one of an AMR (Anisotropic Magnetoresistive) IC and a Hall IC.

Preferably, but not necessarily, the housing may be formed with a height 1.2 to 1.5 times higher than that of the stator.

Preferably, but not necessarily, the angle sensor unit may include a main gear rotating in conjunction with rotation with the rotation shaft formed with the steering input shaft and output shaft coupled to a center, a first sub gear gear-coupled to the main gear; and a second sub gear gear-coupled to any one of the main gear and the first/second sub gears, wherein the main gear and the first/second sub gears are installed inside the housing, and the second sub gear is rotated four to eight times, in a case the main gear is rotated once.

Preferably, but not necessarily, the second sub gear may be rotated four times, in a case the main gear is rotated once.

Preferably, but not necessarily, the revolution ratio between the main gear and the first sub gear may be 1:3.7778.

Preferably, but not necessarily, the number of teeth at the main gear may be 68, the number of teeth at the first sub gear may be 18 and the number of teeth at the second sub gear may be 17.

Preferably, but not necessarily, the housing may include a main housing installed with the main gear, and a sub housing protrusively formed at an end of the main housing and installed with the first and second sub gears.

Preferably, but not necessarily, the main housing may be formed with an inner space unit having a diameter greater than that of the main gear, and may be provided in a shape of a cylinder having a connection unit communicating with the sub housing.

Preferably, but not necessarily, the sub housing may take a shape of a rectangle formed with a width smaller than a radius of the main housing and a thickness corresponding to that of the main housing.

Preferably, but not necessarily, the sub housing may be formed with a separate compartment unit extended from a wall surface of one side of the main housing, and formed with a volume greater than that of the first and second sub gear, but smaller than that of the main housing.

Preferably, but not necessarily, the first and second sub gears may be installed at each body thereof with a magnet, and a surface opposite to the magnet installed at the first and second sub gears of the sub housing may be provided with a magnetic device provided in any one of any one of an AMR (Anisotropic Magnetoresistive) IC and a Hall IC detecting the magnetic force of the magnet.

The torque angle sensor according to exemplary embodiments of the present disclosure has an advantageous effect in that a plurality of magnetic devices is packaged to be simplified into one magnetic device package to reduce the manufacturing cost and to simplify the assembly process by reducing the number of parts, whereby the product can be miniaturized by reduced height of a torque sensor.

Another advantageous effect is that the number of teeth in the main gear and sub gears forming the angle sensor unit is reduced to form gears with a smaller size than that of the conventional gears, and the main gear and the sub gears are arranged in mutual different housings to enable a miniaturization of the housing forming the angle sensor to the advantage of miniaturization of angle sensor.

Still another advantageous effect is that revolution of the sub gear is increased over that of the conventional sub gear to improve a self error ratio of a magnetic device relative to non-linearity accumulated per revolution of the sub gear over the conventional one.

BRIEF DESCRIPTION OF THE DRAWINGS

The accompanying drawings, which are included to provide further understanding of the present disclosure and are incorporated in the present disclosure and constitute a part of this application, and together with the description, serve to explain the principle of the disclosure. In the drawings.

DETAILED DESCRIPTION

Figure 1:
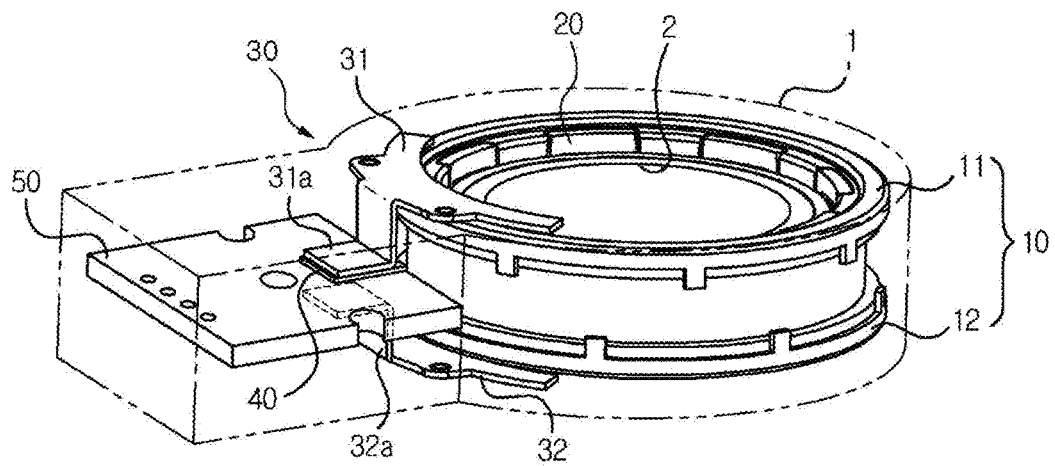
FIG. 1 is a schematic perspective view illustrating a torque angle sensor according to an exemplary embodiment of the present disclosure.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Figure 2:
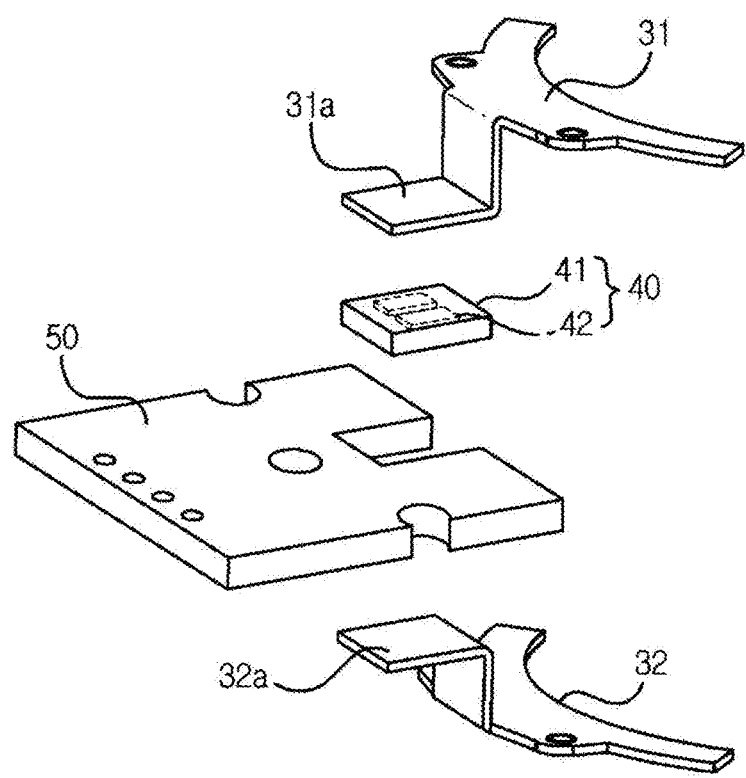
FIG. 2 is an exploded perspective view illustrating an assembled state of a magnetic device and a collector according to an exemplary embodiment of the present disclosure.
Figure 3:
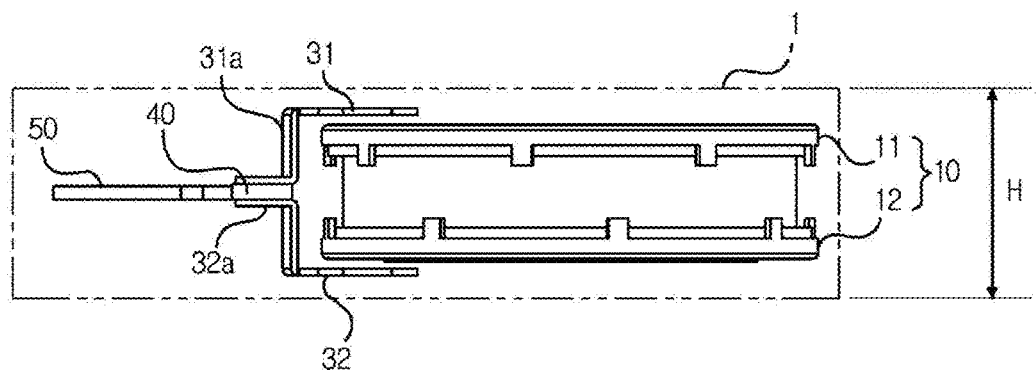
FIG. 3 is a lateral view of FIG. 1.
Figure 4:
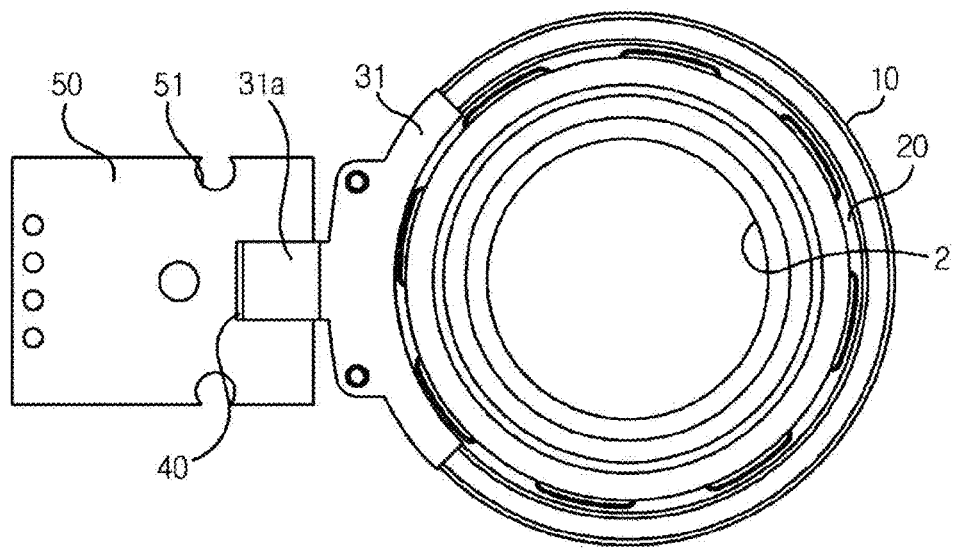
FIG. 4 is a plane view of FIG. 1.

FIG. 1 is a schematic perspective view illustrating a torque angle sensor according to an exemplary embodiment of the present disclosure, FIG. 2 is an exploded perspective view illustrating an assembled state of a magnetic device and a collector according to an exemplary embodiment of the present disclosure, FIG. 3 is a lateral view of FIG. 1, and FIG. 4 is a plane view of FIG. 1.

Referring to FIG. 1, the torque angle sensor according to an exemplary embodiment of the present disclosure may include a torque sensor unit formed inside a housing (1) and an angle sensor unit. The torque sensor unit may include a stator (10), a torque magnet (20), a collector (30), a magnetic device module (40) and a PCB (Printed Circuit Board, 50), as illustrated in FIG. 1

The housing (1) may be formed therein with a space unit housing the stator (10), the torque magnet (20), the collector (30), the magnet device module (40) and the PCB (50), and may form an external look of the torque angle sensor. A height (H, see FIG. 3) of the housing (1) may correspond to that of the stator (10), and the height of the housing (1) may be preferably 1.2 to 1.5 times that of the stator. One of the purposes of the present disclosure is to provide a slim torque angle sensor, such that the height (H) of the housing (1) is preferably as small as possible.

The stator (10) includes an upper stator (11) and a bottom stator (12). The upper and bottom stators (11, 12) are included with a plurality of teeth, each alternatively arranged, where each tooth is preferably arranged spaced apart from the torque magnet (200 at a predetermined distance. The torque magnet (20) may take a shape of a ring, and may be alternatively formed at a periphery with an N pole and an S pole. The torque magnet (20) may be rotated in conjunction with rotation of a rotation shaft (2) by a torque magnet holder (not shown). The collector (30) may include an upper collector (31) and a bottom collector (32).

Referring to FIGS. 1 and 2, each of the upper and bottom collectors (31, 32) may be provided in a symmetrical shape, and may encompass a part of a circumference of the ring-shaped torque magnet (20). Furthermore, each of the upper and bottom collectors (31, 32) may be centrally formed with a first transmission member (31a) and a second transmission member (32a). The first and second transmission members (31a, 32a) may be formed in one body with the upper and bottom collectors (31, 32), and preferably, the first transmission member (31a) may be bent from an upper side of the upper collector (31) to a bottom side of the upper collector (31), while the second transmission member (32a) may be bent from a bottom side of the bottom collector (32) to an upper side of the bottom collector (32). Furthermore, as illustrated in FIG. 2, the first and second transmission members (31a, 32a) may be preferably formed at an approximate center of the upper and bottom collectors (31, 32).

In addition, the first and second transmission members (31a, 32a) may be formed in one body with the upper and bottom collectors (31, 32), but preferably, an extension unit may be formed at distal ends of the upper and bottom collectors (31, 32) formed with a metal material, and the extension unit may be so bent as to allow being surface-contacted to an upper surface and a bottom surface of the magnetic device module (40).

That is, a body portion of the upper and bottom collectors (31, 32) may be vertically formed relative to an axial direction based on the axial direction of the rotation shaft (2), and the first and second transmission members (31a, 32a) may be bent at a right angle) (90°) while being extended from the upper and bottom collectors (31, 32) so as to be parallel with the axial direction. Furthermore, a distal end contacting the magnetic device module (40) may be bent again at a right angle) (90°) from the first and second transmission members (31a, 32a) to be parallel with the upper and bottom collectors (31, 32).

The exemplary embodiment of the present disclosure is characterized by a torque angle sensor using one piece of magnetic device module (40). That is, the magnetic device module (40) may include therein at least one pair of first and second magnetic devices (41, 42), as illustrated in FIG. 2. However, the present disclosure is not limited thereto, and the magnetic device module (40) may include two or more magnetic devices, if necessary.

The first and second magnetic devices (41, 42) may be configured to individually operate, provided in the magnetic device module (40) configured in one packaged module, and may be installed at one time by a configuration in which the magnetic device module (40) is mounted on the PCB (50).

Meanwhile, the magnetic device module (40) may be arranged such that the first and second magnetic devices (41, 42) are spaced apart at a predetermined distance to avoid the first and second magnetic devices (41, 42) from being interfered by each other. At this time, the predetermined distance may be more than each width of the first and second magnetic devices (41, 42).

Meanwhile, the magnetic device forming the magnetic device module (40) may be provided in any one of an AMR (Anisotropic Magnetoresistive) IC and a Hall IC.

Referring to FIGS. 3 and 4, the PCB (50) may be installed with the magnetic device module (40) at one distal end, and may be installed with the magnetic device module (40) to a direction perpendicular to the axial direction of the rotation shaft (2) according to an exemplary embodiment of the present disclosure. Referring to FIG. 4, the PCB (50) may be provided at both lateral surfaces thereof with a screw coupling hole (51) capable of fixing the housing (1), and may be additionally formed with a terminal hole (not shown) for connecting to a controller.

Now, operation of the torque angle sensor according to an exemplary embodiment of the present disclosure will be described in detail with reference to the drawings.

In a case a driver rotates a steering wheel, the rotation shaft (2) connected to the steering wheel is rotated to rotate the torque magnet (20). Then, changes in magnetic field of the torque magnet (20) may be transmitted to the magnetic device module (40) through the first and second transmission members (31a, 32a) of the collector (30).

At this time, only one each of the metal material-formed first and second transmission members (31a, 32a) is provided at an approximate center of the collector (30), and distal ends of the first and second transmission members (31a, 32a) are surface-contacted to an upper surface and a bottom surface of the magnetic device module (40) that is provided with one piece part, where the magnetic device module (40) can detect the changes in magnetic field in response to the rotation of the torque magnet (20).

Meanwhile, the magnetic device module (40) may be provided therein with the first and second magnetic devices (41, 42) installed in a plurality of pieces within one package, where the first and second magnetic devices (41, 42) can individually detect a changed value of the magnetic field collected by the collector (30).

Although the prior art has detected the changes in the magnetic field of the torque magnet (20) using two magnetic devices each formed with a different part, a pair of magnetic devices (41, 42) individually formed inside the one magnetic device module (40) according to the exemplary embodiment of the present disclosure, such that, although a structure per se for detecting the changes in magnetic field by the two magnetic devices may be same, and in a case one magnetic device module (40) is installed at the PCB (50), there is an advantage of reducing the manufacturing cost through reduced number of parts and further simplifying an assembly process as well.

Furthermore, because the PCB (50) installed on the magnetic device module (40) installs the magnetic device module

(40) at a distal end while being installed at the housing (1) to a direction perpendicular to the axial direction of the rotation shaft (2), a height (H) of the housing (1) may be configured to correspond to that of the stator (10). Thus, it is possible to minimize the height (H) of the housing (1) compared with that of the existing structure.

Now, the angle sensor and the torque angle sensor according to an exemplary embodiment of the present disclosure will be described in detail.

Figure 5:
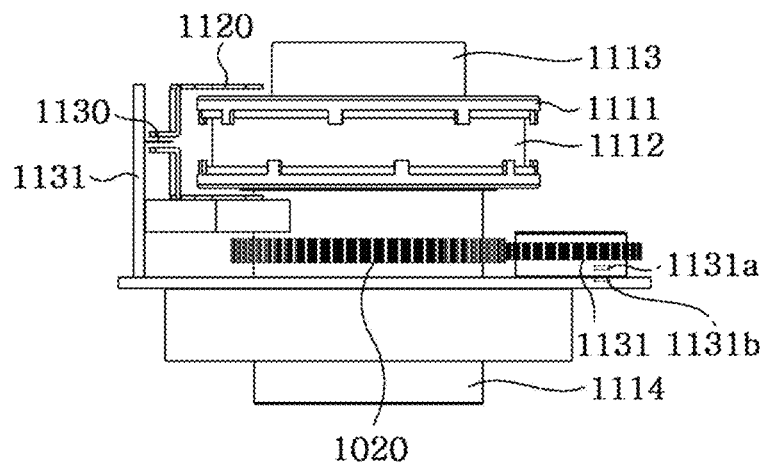
FIG. 5 is a schematic structural view of a torque angle sensor according to the present disclosure.
Figure 6:
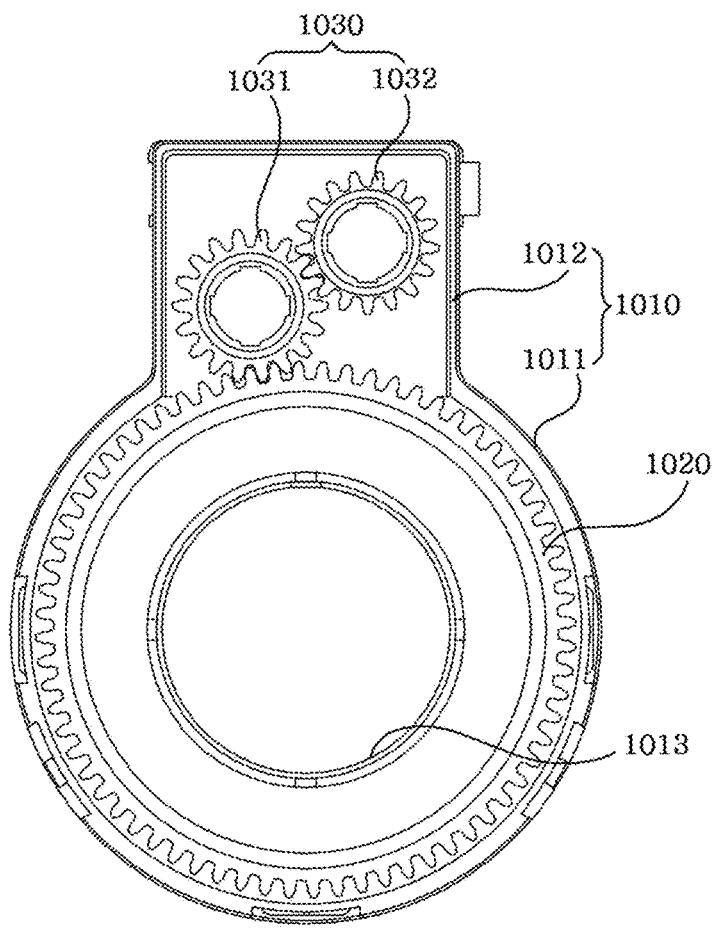
FIG. 6 is a schematic view illustrating a connection structure between a main gear and first/second sub gears of FIG. 5.

FIG. 5 is a schematic structural view of a torque angle sensor according to the present disclosure, and FIG. 6 is a schematic view illustrating a connection structure between a main gear and first/second sub gears of FIG. 5.

Although the present invention relates to an angle sensor, a composite sensor capable of simultaneously measuring a torque and a rotation angle of a rotation shaft is recently focused, instead of a single sensor measuring only an angle of the rotation shaft, such that the present disclosure will describe a torque angle sensor capable of simultaneously measuring a torque and angle information.

Referring to FIG. 5, the torque angle sensor includes a torque sensor unit and an angle sensor unit, and may be connected to an input shaft (1113) and an output shaft (114) respectively. At this time, the input shaft (1113) may be rotated by a driver force to rotate the steering wheel, and the output shaft (1114) may be rotated by receiving for from the input shaft by being connected to a front wheel of a vehicle.

The torque sensor unit includes teeth (1111) and a torque magnet (1112). The teeth (1111) may be integrally formed with the stator, and each tooth may be arranged at a periphery of the torque magnet (1112) rotating along with the input shaft (1113) each spaced apart at a predetermined distance from the other, and changes in magnetic field in response to rotation of the torque sensor (1112) may be collected by using a collector (1120) coupled to the stator.

The torque magnet (1112) may be provided in an approximate shape of a ring, and may be alternatively arranged with an S pole and an N pole, and may be rotated in conjunction with rotation of the input shaft (1113) to rotate the torque magnet (1112).

The magnetic information collected by the collector (1120) can be detected by a magnetic device (1130) to thereby detect the torque of the input shaft (1113). At this time, the magnetic device (1130) is preferably formed with a Hall IC, and may be formed with an AMR IC, if necessary. The magnetic device (1130) is preferably coupled to a predetermined PCB (1131).

Referring to FIGS. 5 and 6, the angle sensor unit may include a main gear (1020) installed inside a housing (1010) and a sub gear (1030). The housing (1010) is preferably divided by a main housing (1011) installed with the main gear (1020) and a sub housing (1012) installed with first and second sub gears (1031, 1032).

The main housing (1011) may be formed with a diameter greater than that of the main gear (1020), and may be formed at a flat surface (an area) with an approximate circle as illustrated in the drawings. Meanwhile, preferably, the main housing (1011) is centrally formed with a through hole capable of allowing the input shaft (1113) and the output shaft (1114) to pass therethrough.

The sub gear (1012) may be so formed as to communicate with a wall surface at one surface of the main housing (1011), and the main gear (1020) and the first sub gear (1031) may be meshed at a connection unit between the main housing (1011) and the sub housing (1012). Although the sub housing (1012) may come in various shapes, the sub housing (1012) according to an exemplary embodiment of the present disclosure is preferably formed with a thickness corresponding to that of the main housing (1011) with an approximate shape of a rectangle. At this time, a width of the sub housing (1012) is preferably smaller than a diameter of the main housing (1011), and more preferably, corresponds to a radius of the main housing (1011).

Meanwhile, the main gear (1020) may be formed in the shape of a ring rotating along with the input shaft (1113) and/or the output shaft (1114), and the sub gear (1030) may be configured with first and second sub gears (1031, 1032) rotating in conjunction with the main gear (1020).

Referring to FIG. 5, the first and second sub gears (1031, 1032) may be installed with a magnet (1031a), and the housing (1010, see FIG. 6) corresponding to the magnet (1031a) may be installed with a magnetic device (1031b) detecting a magnetic force of the magnet (1031a). The magnetic device (1031b) may be formed with an AMR (Anisotropic Magnetoresistive) IC or a Hall IC. The magnetic device (1031b) needs to be arranged at a surface opposite to the magnet (1031a), and as illustrated in FIG. 5, the magnetic device (1031b) is preferably installed at a floor surface of the sub housing (1012) forming a part of the housing (1010).

Each of the main gear (1020) and the first and second sub gears (1031, 1032) according to another exemplary embodiment of the present disclosure is gear-coupled, and it may be possible that the first and second sub gears (1031, 1032) are rotated in conjunction with rotation of the main gear (1020).

That is, in a case the main gear (1020) is rotated, the first and second sub gears (1031, 1032) can individually rotate in conjunction with rotation of the main gear (1020) as the first and second sub gears (1031, 1032) are individually gear-coupled to the main gear (1020), and at this time, if the number of teeth at the first sub gear (1031) and the number of teeth at the second sub gear (1032) are configured same, the first and second sub gears (1031, 1032) can rotate in the same revolution as that of the main gear (1020), and if the number of teeth at the first sub gear (1031) and the number of teeth at the second sub gear (1032) are configured differently, the first and second sub gears (1031, 1032) can rotate in the different revolution as that of the main gear (1020) based on the respective gear ratio. The ratio of the revolution of the first and second sub gears (1031, 1032) may be changed, if necessary.

The main gear (1020) and the sub gear (1030) formed with the first and second sub gears (1031, 1032) are preferably formed with a same type of gear, and all the main gear (1020) and the first and second sub gears (1031, 1032) according to the exemplary embodiment of the present disclosure may be configured with a spur gear.

Furthermore, each of the main gear (1020) and the first and second sub gears (1031, 1032) is formed with a predetermined ratio of teeth, and the revolution of the second sub gear (1032) may be rotated four times to eight times, in a case the main gear (1020) is rotated once.

According to an exemplary embodiment of the present disclosure, the revolution ratio between the main gear (1020) and the first and second sub gears (1031, 1032) based on teeth of the main gear (1020) and the first and second sub gears (1031, 1032) may be provided in the ratio of 1:3.7778:4, such that it is preferable that the revolution of the second sub gear (1032) be rotated four times, in a case the main gear (1020) is rotated once. To this end, the number of teeth at the main gear (1020) may be 68, the number of teeth at the first sub gear (1031) may be 18 and the number of teeth at the second sub gear (1032) may be 17.

Although the gear ratio between the main gear (1020) and the first and second sub gears (1031, 1032) is conventionally provided in the ratio of 1:1.7778:2 to allow the second sub gear (1032) to rotate twice during one time rotation of the main gear (1020), and a period among the main gear (1020) and the first and second sub gears (1031, 1032) is conventionally configured at 1,620 degrees, a period among the gears in the present disclosure is configured to equally maintain 1,620 degrees, but the ratio of gear revolution based on the number of teeth of the main gear (1020) and the first and second sub gears (1031, 1032) is changed to 1: 3.7778:4 to allow the second sub gear (1032) to rotate four times during one time rotation of the main gear (1020).

At this time, the meaning of fixing the period among the gears at 1,620 degrees is that the main gear (1020) and the sub gears (1031, 1032) return to original places, in a case the main gear (1020) and the sub gears (1031, 1032) are rotated clockwise or counterclockwise, and the angle sensor according to the present disclosure is useable within this scope.

According to the present disclosure, a period among each gear can be maintained as per the conventional configuration, such that the conventional configuration can be promptly replaced by the torque angle sensor improved by the present disclosure and used without any change in programs installed in a controller for error compensation in the existing product.

Furthermore, in a case the number of teeth on the sub gears (1031, 1032) relative to that of the main gear (1020) is reduced and revolution based thereon is increased, an entire size of the main gear (1020) and the sub gears (1031, 1032) can be reduced to provide a further miniaturized angle sensor.

Still furthermore, because the ratio of revolution between the main gear (1020) and the second sub gear (1032) responsible for fine gain of output is twice increased from the conventional two times to four times, a data amount measured by the magnetic device can be increased twofold to thereby reduce a measurement error by 50%.

Meanwhile, the second sub gear (1032) is preferably configured to rotate at a revolution ratio of $2n$ relative to one time of revolution of the main gear (1020). However, in a case the revolution of the second sub gear (1032) is configured to be excessively greater, the manufacturing of gears becomes difficult, such that it is preferable that revolution of the second sub gear (1032) be configured to be 8 at the maximum.

In a case the present disclosure is applied to the torque angle sensor as explained above, in view of the fact that the housing (1010) may be used as a case forming an exterior of the torque angle sensor, the main gear (1020) may be installed at a bottom surface of the stator, and the main gear (1020) may be arranged on a same planar surface as that of the first and second sub gears (1031, 1032).

Generally, the reason of arranging two sub gears as illustrated is to realize a difference of effective revolutions, such that it should be apparent to the skilled in the art that one sub gear, three or more sub gears may be installed, if necessary for design.

Meanwhile, although the foregoing has exemplified a configuration applied with the present disclosure to the torque angle sensor for convenience of easy understanding, the present disclosure is not limited thereto. That is, the present disclosure may be applied to a TAS (Torque Angle Sensor) coupled to the torque sensor as explained above, and to a composite sensor including a TIS (Torque Index Sensor). In addition, the present disclosure may be applied to an angle sensor for calculating a pure rotation angle of a rotation shaft minus a torque sensor.

By way of non-limiting example, in a case the above configuration is applied to a composite sensor including the torque index sensor, an index magnet (not shown) may be arranged at a bottom surface of the main gear (1020) as a position rotating in conjunction with the output shaft (1114) inside the housing (1011), and the index sensor detecting one revolution of the index magnet may be installed at a sub housing (11) side.

In a case the angle sensor unit is configured as explained above, the revolution of the second sub gear (1032) increases twofold from the conventional two revolution to four revolution, whereby a self error ratio of the Hall IC relative to non-linearity decreases in response to revolution ratio to thereby improve reliability of an output value at the angle sensor unit.

Furthermore, the present disclosure is advantageous in reducing the size of the angle sensor unit, because the number of teeth at the first and second sub gears (1031, 1032) decreases over that of the prior art, and the size of the first and second sub gears (1031, 1032) is miniaturized. That is, the main gear (1020) is accommodated in a the main housing (1011), and the first and second sub gears (1031, 1032) are accommodated in a sub housing (1012) which is a separate space unit from the main housing (1011) to enable a minimization of a diameter at the main housing (1011).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A torque angle sensor, the torque angle sensor comprising: a housing centrally arranged with a rotation shaft; a torque sensor unit installed inside the housing to detect a torque change between an input shaft and an output shaft; and an angle sensor unit installed inside the housing to detect an angle change between the input shaft and the output shaft, wherein each of the torque sensor unit and the angle sensor unit is installed at a different section of the housing;

wherein the torque sensor unit comprises a Printed Circuit Board (PCB), a stator, a torque magnet installed at a center of the stator, and a collector; and wherein one portion of the collector is connected with the stator and another portion of the collector is connected with the PCB, and the PCB is mounted on a lateral outer surface of the torque magnet.

2. The torque angle sensor of claim 1, wherein the stator is installed inside the housing, the torque magnet is rotatably installed at the center of the stator in conjunction with rotary operation of the rotation shaft, the collector is installed at the housing to transmit a magnetic field of the torque magnet, a magnetic device module is formed with an individually operating a first magnetic device and a second magnetic device in one package to detect the magnetic field transmitted by the collector, and the PCB is mounted with the magnetic device module, wherein the PCB is arranged in a direction perpendicular to an axial direction of the rotation shaft and installed at a distal end with the magnetic device module.

3. The torque angle sensor of claim 2, wherein the collector includes an upper collector arranged at an upper surface of the stator, and a bottom collector arranged at a bottom surface of the stator, wherein the upper and bottom collectors are symmetrically provided and are integrally formed near at a center thereof with a first transmission member and a second transmission member.

4. The torque angle sensor of claim 3, wherein the first and second transmission members are integrally formed with the upper and bottom collectors in one body, bent at least twice and surface-contacted to at a distal end thereof to the magnetic device module.

5. The torque angle sensor of claim 1, wherein the magnetic device module is provided in any one of an AMR (Anisotropic Magnetoresistive) IC and a Hall IC.

6. The torque angle sensor of claim 1, wherein the housing is formed with a height 1.2 to 1.5 times higher than that of the stator.

7. The torque angle sensor of claim 1, wherein the angle sensor unit includes a main gear rotating in conjunction with rotation with the rotation shaft formed with the steering input shaft and output shaft coupled to a center, a first sub gear gear-coupled to the main gear; and a second sub gear gear-coupled to any one of the main gear and the first/second sub gears, wherein the main gear and the first/second sub gears are installed inside the housing, and the second sub gear is rotated four to eight times, in a case the main gear is rotated once.

8. The torque angle sensor of claim 7, wherein the second sub gear is rotated four times, in a case the main gear is rotated once.

9. The torque angle sensor of claim 7, wherein the revolution ratio between the main gear and the first sub gear is 1:3.7778.

10. The torque angle sensor of claim 7, wherein the number of teeth at the main gear is 68, the number of teeth at the first sub gear is 18 and the number of teeth at the second sub gear is 17.

11. The torque angle sensor of claim 7, wherein the housing includes a main housing installed with the main gear, and a sub housing protrusively formed at an end of the main housing and installed with the first and second sub gears.

12. The torque angle sensor of claim 11, wherein the main housing is formed with an inner space unit having a diameter greater than that of the main gear, and is provided in a shape of a cylinder having a connection unit communicating with the sub housing.

13. The torque angle sensor of claim 11, wherein the sub housing takes a shape of a rectangle formed with a width smaller than a radius of the main housing and a thickness corresponding to that of the main housing.

14. The torque angle sensor of claim 11, wherein the sub housing is formed with a separate compartment unit extended from a wall surface of one side of the main housing, and formed with a volume greater than that of the first and second sub gear, but smaller than that of the main housing.

15. The torque angle sensor of claim 13, wherein the first and second sub gears are installed at each body thereof with a magnet, and a surface opposite to the magnet installed at the first and second sub gears of the sub housing is provided with a magnetic device provided in any one of any one of an AMR (Anisotropic Magnetoresistive) IC and a Hall IC detecting the magnetic force of the magnet.

* * * * *